United States Patent [19]

Brown

[11] 4,006,664
[45] Feb. 8, 1977

[54] STEERING SYSTEM INCLUDING TANDEM HYDRAULIC CYLINDERS WITH SELF-SYNCHRONIZATION

[75] Inventor: Wilburn Kelly Brown, Morton Grove, Ill.

[73] Assignee: Pettibone Corporation, Chicago, Ill.

[22] Filed: Apr. 3, 1975

[21] Appl. No.: 564,868

[52] U.S. Cl. .............................. 91/171; 91/189 R; 60/546; 60/547
[51] Int. Cl.² .................... F01B 25/04; F15B 11/22
[58] Field of Search ........... 91/171, 189 R; 60/546, 60/547

[56] References Cited
UNITED STATES PATENTS

| 3,636,817 | 1/1972 | Shapiro ................................. 91/171 |
| 3,648,565 | 3/1972 | Probut et al. ......................... 91/171 |

Primary Examiner—Paul E. Maslousky
Attorney, Agent, or Firm—Darbo, Robertson & Vandenburgh

[57] ABSTRACT

The invention is especially suitable when front and rear wheels are hydraulically steered, each set by its own hydraulic cylinder, the two cylinders being connected in hydraulic tandem so that the same angularity of steering will be imparted to both sets of wheels. The self-synchronizing of the present invention overcomes a serious prior fault that occasionally a nonsynchronous relationship would develop. The present invention opens a synchronizing valve on the occasion of each extreme swing of the wheels. A check valve then ensures a synchronized return swing.

2 Claims, 2 Drawing Figures

STEERING SYSTEM INCLUDING TANDEM HYDRAULIC CYLINDERS WITH SELF-SYNCHRONIZATION

INTRODUCTION

When four-wheel steering is desired on a vehicle, a preferred way of achieving this is to use one hydraulic cylinder for the front wheels and another hydraulic cylinder for the rear wheels, with no connecting linkage. This presents a problem of maintaining synchronization. It is highly desirable that when a vehicle is proceeding along a straight line, the steering for both front and rear wheels be exactly centered so that the rear wheels will accurately track the front wheels. Without accurate synchronization of the hydraulic cylinders, this will not occur. Likewise it is highly desirable that when one set of steerable wheels is given its maximum steering swing the other set of wheels also be given its maximum steering swing. Otherwise, the vehicle does not achieve as short a turning radius as that of which it is capable. Lack of synchronization prevents achieving this shortest-available turning radius. Four-wheel steering is especially likely to be used with four-wheel drive, and when the steering wheels are driven, the angularity of their swing for steering is commonly rather restricted, especially in work vehicles. It follows that the maximum swing for steering is used quite frequently and failing to achieve it because of nonsynchronization would be quite objectionable.

It might seem that synchronization can be ensured by connecting the hydraulic cylinders in hydraulic series or tandem. This means that as hydraulic fluid under pump pressure is supplied to one end of the first cylinder, the second cylinder will be equally operated by the oil which is ejected from the first cylinder. In practice, however, synchronization can be lost so that the theoretical perfection of such a system is not uniformly achieved.

According to the present invention, virtually perfect synchronization is usually maintained constantly and reliably by the automatic opening of a synchronizing valve at the limit of each maximum swing, or of each maximum swing in one direction. Although the synchronizing valve remains open until the return swing has started, an associated check valve prevents this open valve from causing a new missynchronization at the start of this return swing.

The advantages and features of the invention will be more apparent from the following description and from the drawings.

DESIGNATION OF FIGURES

BACKGROUND DESCRIPTION

Figure 1:
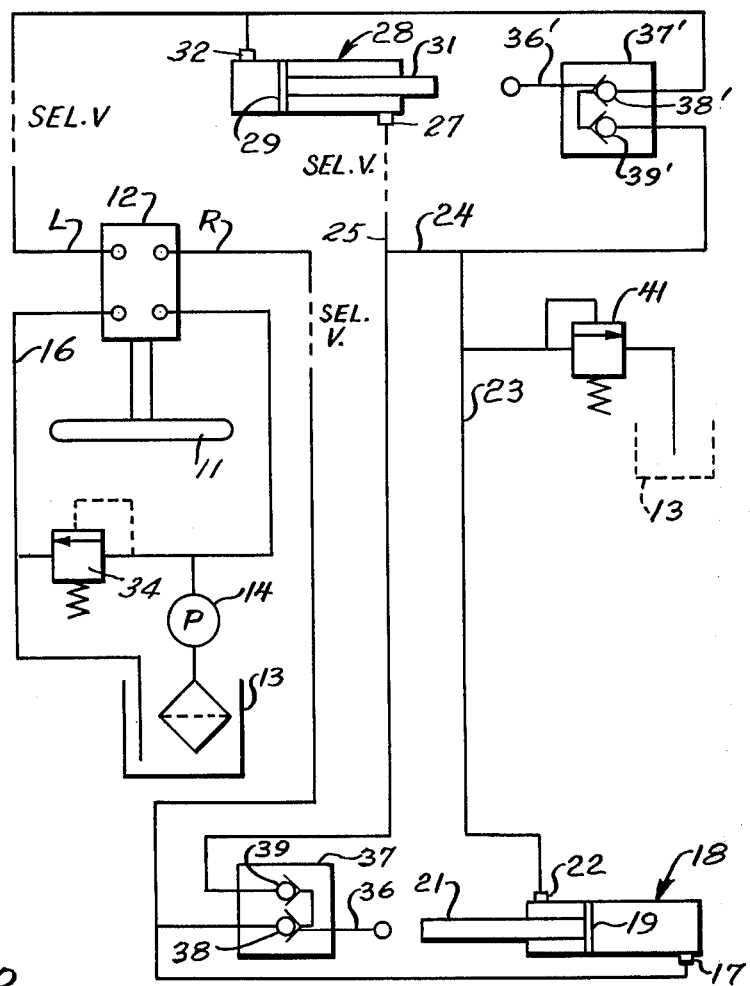
FIG. 1 is a diagrammatic view of one form of the system chosen for illustration of this invention.

Although the following disclosure, offered for public dissemination in the event adequate patent protection is available, is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

In all-hydraulic four-wheel steering, the steering wheel 11 operates a metering valving unit 12 which may be of conventional form that (ignoring conventional refinements) serves as a reversing valve to supply hydraulic fluid under pressure either to a right steering line R or to a left steering line L, depending upon the direction in which the steering wheel 11 is turned, and connecting the other steering line to return. Of course, the oil, as the hydraulic fluid is commonly called, is drawn from a reservoir 13 by a pump 14, and oil is returned to the reservoir 13 through valving unit 12 and return line 16. If steering is to the right, the pressured oil is supplied through line R to the closed-end port 17 of a first cylinder 18, thus actuating its piston 19 and extending its piston rod 21 which (through suitable mechanical connections not shown) steers one set of wheels, such as the rear wheels. The movement of piston 19 extrudes oil through the rod-end port 22 of cylinder 18 and this oil is carried by tandem line 23, 24, 25 to the rod-end port 27 of cylinder 28. This moves its piston 29 in a direction to retract rod 31, forcing oil out through port 32. The rod 29 is mechanically connected to the other set of wheels, in this instance the front wheels, to turn them oppositely, i.e., for the same direction of steering as the previously mentioned wheels are being turned. The cylinders being of the same size, and the two rod chambers being connected, the two movements are exactly synchronized. In other words, whatever movement occurs for the piston 19 is duplicated by the piston 29.

Unfortunately, this perfect synchronization is not always dependable, and small successive changes can be cumulative so that they add up to a substantial failure of synchronization. This can be illustrated by assuming that there is no leakage past the pistons 19 and 29, except that on each occasion of steering to the right, about one drop of oil seeps past piston 29 in the direction from the rod side to the blind side, the blind side at that time not being pressurized. During any one occasion of steering, this seepage of about a drop would be negligible. But in the course of a few days or weeks of constant operation, enough drops would have seeped past the piston so that the operation would be badly out of synchronism. A badly leaking piston cap may require correction several times an hour. For example, the piston 19 would strike home at the rod end of its cylinder while the piston 29 was still a long ways from striking home against the closed end of its cylinder.

Heretofore, the best correction for such missynchronization has involved stopping the vehicle and making a series of operations involving both the steering wheel and a selector valve commonly provided with this type of steering. With increased frequency of need for resynchronizing, this becomes increasingly intolerable. For simplicity the selector valve is represented in the drawings only by three broken lines marked "Sel. V.".

The frequency with which appreciable missynchronization occurs may depend somewhat upon the hydraulic pressures to which the leakage or seepage points are subjected. In this connection it may be mentioned that much of the steering of heavy-duty four-wheel drive vehicles tends to be at slow speeds and in rutty ground conditions for which higher and more prolonged steering pressures are needed than for high-speed highway travel. There may be frequent approach to the maximum pressure determined by an unloading valve 34.

SELF-SYNCHRONIZATION (1)

Figure 2:
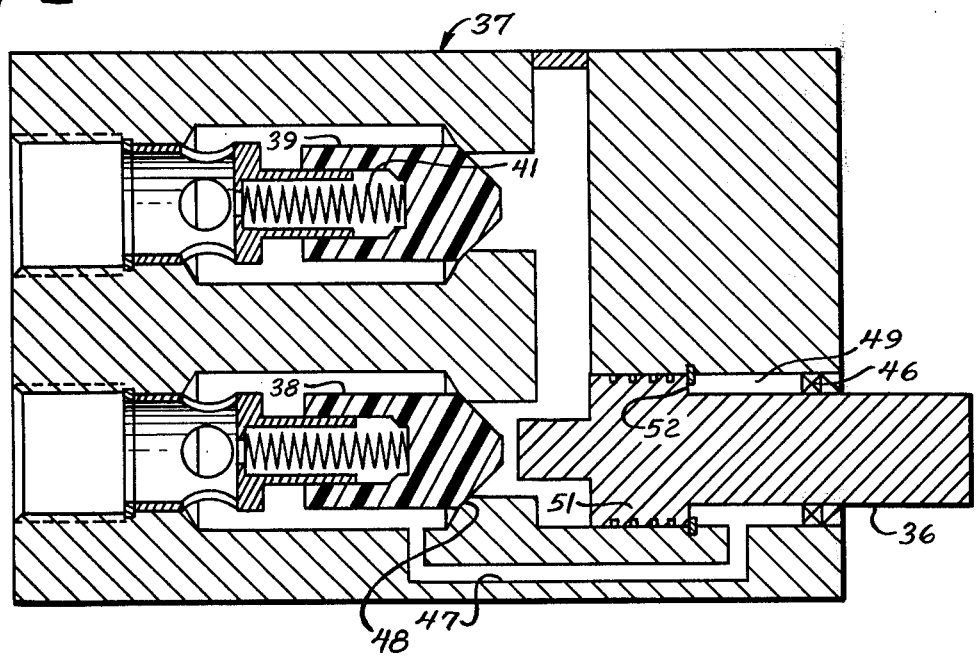
FIG. 2 is a sectional view of a valve unit used in FIG. 1, comprising a synchronizing valve and an associated check valve.

According to the present invention, a synchronizing valve is opened every time an extreme steering swing of the wheels is made, so that there is never a chance for the cumulative missynchronization of the type described to develop. For example, if the steering is to the right, then as piston rod 21 moves to the limit of its movement, it actuates a plunger 36 of valve assembly 37, opening a valve 38 therein. This allows pressure from the same line R which was accomplishing the steering to flow through valve 38, open check valve 39 by its pressure, and flow through the cylinder port 27 to move piston 29 all of the way to its extreme left position, if it was not there already. As seen in FIG. 2, check valve 39 is biased toward the closed position by a spring 41 so that as soon as the synchronizing oil stops flowing, valve 39 will close. Now, when steering wheel 11 is turned in the opposite direction for the return swing of the steering wheels, it supplies oil to line L and this oil flowing through port 32 moves piston 29 to the right, extruding oil through port 27. Check valve 39 prevents any of this oil from flowing through valve assembly 37, and hence it must flow through tandem line 25, 24, 23 into port 22 to move piston 19 in exact synchronism with piston 29. If this return swing is continued all of the way to the limit of the left-steer swing, piston rod 31 will actuate plunger 36' of a second synchronizing valve assembly 37' with action similar to that described. Thus plunger 36' opens valve 38' so that the pressure from line L can open valve 39' and cause oil to flow into port 22 to move piston 19 to the extreme right, if it is not there already. Again, the check valve 39 is spring-closed when there is no oil flow so that upon again turning the steering wheel 11 to the right, the movement of piston 19 to the left causes an exactly synchronized movement of piston 29 to the left.

When both piston rods 21 and 31 are extended to their extreme positions, both valve assemblies 37 and 37' will be forced open at the valve members 38. Oil is prevented from flowing out to the unpressured line by the check valves 39 leading to it. The pressure in the pressured line can open its valve 39 and flow into the tandem line 23 only if and when the retracted piston is fully retracted.

One of the valve assemblies 37 and 37' will often be enough. Resynchronization will then only occur with extreme steering swings in the direction to trip the one valve member 38. However, in many or most types of work, this will occur more often than synchronization would be noticeably needed.

Although it is not necessary that the valve 38 be of check valve nature, it has been shown substantially identical to check valve 39, duplication of parts being economical and desirable from the servicing standpoint. Furthermore, this type of valve is highly dependable.

Any leakage of oil from valve assembly 37 along the plunger 36 would of course be objectionable. It would be especially objectionable if it was leakage from the tandem line because it would contribute to missymmetry. An oil seal 46 is therefore provided around plunger 36.

In order that there will be no noticeable resistance to further movement of the steering swing when piston rod 21 engages plunger 36 and presses valve 38 against the pressure trying to flow through it, the plunger 36 is preferably counter-pressured. Thus a capillary passage 47 provides a small oil flow from the pressure side of valve seat 48 to an annular chamber 49 surrounding the stem of plunger 39. This exerts a pressure on piston 51 of plunger 36 in the direction tending to open valve 48. Preferably the rear face 52 of piston 51 has an area large enough to overcome something like three-fourths of the net valve-closing force exerted hydraulically on valve 38. The exact proportion is a matter of choice, except that the closing force should not be so fully offset as to be undependable.

It is preferred, and perhaps important, that the rod ends of the cylinders be connected together rather than the closed or blind ends. This not only requires less pump pressure, as before, but tends to increase the probability that seepage will be in the direction correctable by the synchronizing valve. Other valve systems can, of course, be used at least in theory, and operation could be electrical. In the latter event, there would be a limit switch for each of cylinders 18 and 28, tripped when its rod is fully extended. As in the illustrated form, it is preferable, and perhaps essential for practicability, that the following considerations be met:

1. The source of synchronizing pressure is the pressured steering line rather than some independent source which might yield a higher pressure, high enough to cause an excess of oil in the rod chambers;

2. Outflow of oil from the tandem line is prevented, even while the rods are in their most extended condition. Otherwise, the next steering movements may not start in synchronism.

SELF-SYNCHRONIZATION (2)

The self-synchronization so far described assumes seepage past the piston from the rod end to the blind end. This results in there being a deficiency in the amount of "tandem oil", the combined quantity of oil in the two rod chambers. There may be an equal chance that the lack of synchronization will be in the opposite direction, resulting from seepage of oil past one of the pistons from its blind end to its rod end. This can occur because the pressure during steering will normally be almost twice as high in the chamber to which the pump pressure is supplied as in the rod chambers. This may seem to those skilled in the art to be an erroneous statement because there is universal recognition that the rod side normally has higher pressure because the effective area of the piston on that side is smaller than the effective area on the other side. However, in the case of tandem steering cylinders, the pressure of the rod side oil is only that required to work one set of wheels while the pressure on the blind side of the piston to which pressure is supplied must be high enough to do twice that amount of work, namely the work of turning all four wheels.

This condition of missynchronization due to too much oil in the tandem chambers (the rod chambers) is corrected according to another aspect of the present invention by providing an unloading valve 41 which may be identical to the unloading valve 34. If we now assume that there is too much oil in the tandem chambers (the rod chambers) and that the wheel is turned to the right so that pressure oil is supplied to port 17, piston 29 will seat against the blind end of cylinder 28 before piston 19 reaches the end of its stroke. However, with continued turning of the steering wheel 11 to the right, more oil will be supplied to port 17, at an available pressure determined by the unloading valve 34. This pressure tends to produce an even higher pressure of the tandem oil in the rod chambers and the connecting line 23 because of the smaller area on the rod side of piston 19. This higher pressure is therefore high enough to trip unloading valve 41, even if the unloading valve 41 has the same pressure setting as the unloading valve 34. Accordingly, the excess of oil is squeezed through the unloading valve 41 to reservoir 13, thereby permitting the piston 19 to complete its stroke. For this one condition, therefore, the single unloading valve 41 can produce perfect synchronization, in the event of excessive tandem oil, at each extreme steering swing in either direction.

No determination has yet been made that both types of self-synchronization should always be provided. There may be conditions under which nearly all of the instances of missynchronization would be of the same type so that only self-synchronization for that type needs to be provided. In that event, when the other type of missynchronization does occasionally occur, it would be corrected in the manner now available by the relatively complex operation involving use of the selector valve, stopping the vehicle for this resynchronizing operation.

Pressure relief valve 41 may be of the simple pressure relief type (as may valve 34) if a less smooth operation is acceptable.

ACHIEVEMENT

From the foregoing it is seen that frequent resynchronization of a tandem-cylinder system is provided which reliably maintains synchronization if both forms of self-synchronizing are provided. At the end of an extreme steering swing, if there is too little tandem oil, pump pressure is supplied to the tandem connection between the cylinders to let oil under operating pressure be added to ensure that the piston which is at the time acting as secondary to the other will be fully actuated to the limit of its movement. This accurately synchronizes the secondary piston with the primary piston. A check valve associated with the thus-opened synchronization valve closes as soon as any synchronization flow of oil has ceased, thereby ensuring that upon start of the return swing both pistons will move in exact synchronism. If there is an excess of tandem oil, a pressure relief valve lets the excess return to tank 13, allowing the then-primary piston to complete its stroke. By thus maintaining exact synchronism at all times, the rear wheels are sure to track the forward wheels in straight driving, as they should, and achieving the shortest available turning radius on each occasion of maximum swing of the steering wheels is ensured. Furthermore, in shifting a control valve from two-wheel steer or crab steer to four-wheel steer, synchronization is easily achieved by one or two extreme steering swings.

An unexpected result of the self-synchronization provided is to improve "crab" steering if single-rod pistons are used. Crab steering is accomplished by turning the selector valve to a position at which the connections to one of the cylinders are reversed, as compared to that shown. The system then resulting is inherently nonsynchronous, if single-rod pistons are used, because a rod chamber is then connected to a blind chamber of larger volume. If we assume turning the steering wheel 11 to the right with such a system, and assume that the connections to cylinder 28 have been reversed, then pressure oil is supplied to port 17 and oil from the rod side of cylinder 18 is supplied to port 32. Now, when piston 19 reaches the end of its stroke, it will not have discharged enough oil to move piston 29 its full stroke. However, if steering wheel 11 continues to be turned to the right, it will supply more pressure oil through valve 37 to make piston 29 complete its stroke. Now, however, there is too much oil in the tandem chambers. When steering wheel 11 is turned to the left, piston 19 will move more rapidly than piston 29 and reach the end of its stroke before piston 29 can complete its stroke. However, merely by continuing to turn the steering wheel 11 to the left, more oil will be supplied through line L, now connected to port 27, thus increasing the oil pressures until excess tandem oil escapes through unloading valve 41 to tank 13, allowing piston 29 to complete its stroke. Thus with both types of self-synchronization provided, it becomes possible with crab steering to turn all wheels to the maximum, first in one direction and then in the other, merely by turning the steering wheel 11. This is quite valuable whenever there is much crab steering, because when crab steering is desired, it is likely that full-swing crab steering will be desired, with equal sidewise movement at both ends.

I claim:

1. A steering system for use with front and rear steerable wheels, including a pair of cylinder-piston combinations, one for front-wheel steering and one for rear-wheel steering, having cylinders, each with a piston rod extending through at least one end, at times connected through a tandem line connecting a rod end of each to the other, steering valve means for reversably connecting the opposite ends at will to pressure and return lines respectively to operate either combination as a primary piston and cylinder, with development of a primary pressure therein, and the other as a secondary piston and cylinder operated by discharge from the primary cylinder, having the improvement which comprises:

a synchronizing valve assembly including a synchronizing valve having means biasing it to be normally closed; solely-mechanical means including one of said piston rods, extending from one of said pistons and engaging the syhchronizing valve to actuate said valve by force derived from said one piston, when primary pressure moves said one piston to the extreme end of its movement, to supply pressure oil at the primary pressure through a check valve to the tandem line, thereby ensuring full movement of the other or secondary piston, said synchronizing valve being held open by said mechanical action until retraction of said one piston by pressure in the tandem line allows said synchronizing valve to close, said check valve preventing loss of pressure in the tandem line by outflow through the synchronizing valve while held open.

2. A steering system for use with front and rear steerable wheels including a pair of cylinder-piston combinations, one for front-wheel steering and one for rear-wheel steering, having cylinders, each with a piston rod extending through at least one end, at times connected through a tandem line connecting a rod end of each to the other, steering valve means for reversably connecting the opposite ends at will to pressure and return lines respectively to operate either combination as a primary piston and cylinder, with development of a primary pressure therein, and the other as a secondary piston and cylinder operated by discharge from the primary cylinder, having the improvement which comprises:

a synchronizing valve assembly including a synchronizing valve having means biasing it to be normally closed; solely-mechanical means including one of said piston rods, extending from one of said pistons and engaging the synchronizing valve to actuate said valve by force derived from said one piston, when primary pressure moves said one piston to the extreme end of its movement, to supply pressure oil at the primary pressure through a check valve to the tandem line, thereby ensuring full movement of the other or secondary piston, said synchronizing valve being held open by said mechanical action until retraction of said one piston by pressure in the tandem line allows said synchronizing valve to close, said check valve preventing loss of pressure in the tandem line by outflow through the synchronizing valve while held open; and a pressure-relief valve responsive to static pressure developed in the tandem line as maximum available primary pressure is closely approached when the secondary piston reaches the full movement before the primary piston does, for allowing escape of oil from the tandem line when an excess of tandem oil would otherwise prevent full-stroke operation of the primary piston.

* * * * *